(12) United States Patent
Luu et al.

(10) Patent No.: US 8,564,849 B2
(45) Date of Patent: Oct. 22, 2013

(54) SYSTEM, METHOD, AND COMPUTER READABLE MEDIUM FOR SCANNING A DOCUMENT HAVING A RAISED IMAGE ON IT

(75) Inventors: Calvin Luu, San Jose, CA (US); Isao Hayami, Yokohama (JP)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1093 days.

(21) Appl. No.: 12/547,333

(22) Filed: Aug. 25, 2009

(65) Prior Publication Data
US 2011/0050724 A1    Mar. 3, 2011

(51) Int. Cl.
G09G 5/00    (2006.01)
H04N 1/04    (2006.01)

(52) U.S. Cl.
USPC ........... 358/474; 358/472; 358/473; 358/475; 358/487; 382/274; 382/172; 399/100; 235/454

(58) Field of Classification Search
USPC ............... 358/474; 345/629; 382/274, 172; 399/100; 235/454
See application file for complete search history.

(56) References Cited

U.S. PATENT DOCUMENTS

| | | | |
|---|---|---|---|
| 7,593,591 B2 * | 9/2009 | Achong et al. | 382/274 |
| 2003/0107781 A1 | 6/2003 | Ozawa | |
| 2003/0178487 A1 * | 9/2003 | Rogers | 235/454 |
| 2005/0078329 A1 | 4/2005 | Shiokawa et al. | |
| 2007/0164240 A1 | 7/2007 | Shinno et al. | |

* cited by examiner

*Primary Examiner* — Steven Kau
*Assistant Examiner* — Quang N Vo
(74) *Attorney, Agent, or Firm* — Buchanan Ingersoll & Rooney PC

(57) ABSTRACT

A method and system include using a scanner to copy a document containing an original image and an embossment. The method includes first scanning a front face of the document from which the original image is visible to form a first image, wherein the first scanning is conducted with a sensitivity such that the embossment is essentially not visible in the first image; increasing a sensitivity of the scanner; second scanning the document to create a second image, wherein the embossment is visible in the second image; combining the first and second images so as to obtain a reproduction image of the original image containing the embossment.

23 Claims, 12 Drawing Sheets

SYSTEM, METHOD, AND COMPUTER READABLE MEDIUM FOR SCANNING A DOCUMENT HAVING A RAISED IMAGE ON IT

FIELD OF THE INVENTION

The present invention relates to a system, a method, and a computer readable medium for scanning a document having an original image and an embossment on it.

DESCRIPTION OF THE RELATED ART

Many documents are embossed with a raised seal, such as a seal from a notary public or other government agencies. When copying such a document with a conventional photocopier, the embossed seal is usually not picked up by the sensors when the sensitivity of the copier is set at a level appropriate for copying a remainder of the document. As a result, when copying such an embossed document with a conventional copier, the image on the document is adequately copied. However, the embossed seal is usually not detected on the copy.

Similar issues may occur with other types of documents having raised or dimensional issues, such as braille documents or documents including folded lines. The concepts of the present invention are equally applicable to such other types of documents.

Prior to the present invention, there was a need in the art for a convenient system for copying an embossed document so that both the image on the document, as well as the embossment thereon could be easily copied.

OBJECTS AND SUMMARY OF THE INVENTION

In consideration of the above objects, a method is disclosed for copying a document containing an original image and an embossment. The method comprises using a scanner to copy a document containing an original image and an embossment. The method comprises first scanning a front face of the document from which the original image is visible to form a first image, wherein the first scanning is conducted with a sensitivity such that the embossment is essentially not visible in the first image; increasing a sensitivity of the scanner; second scanning the document to create a second image, wherein the embossment is visible in the second image; combining the first and second images so as to obtain a reproduction image of the original image containing the embossment.

A method of copying a document containing an original image and an embossment is also provided that comprises first scanning a front face of the document from which the original image is visible to form a first image; second scanning a reverse face of the document from which the embossment is visible to create a second image, wherein the second image includes a reverse image of the embossment; reversing the second image to create a third image which is a true image of the embossment; and combining the first and third images so as to obtain a reproduction image of the original image containing the embossment.

A method of copying a document containing an original image and an embossment is also provided that comprises first scanning a front face of the document from which the original image is visible to form a first image, wherein the first image includes a background image and a foreground image; increasing a sensitivity of the scanner; second scanning a reverse face of the document to create a second image, wherein the second image includes a mirror image of the embossment and a mirror image of at least portions of the original image; reversing the first image to create a third image which is a mirror image of the first image; editing the second image by removing the third image from the second image; and reversing the edited second image to create a fourth image which is a true image of the embossment; combining the first image and the fourth image so as to obtain a reproduction image of the original image containing the embossment.

A computer readable medium encoded with a program for causing an image processing apparatus to effect the foregoing methods is also contemplated. And, an image processing apparatus to effect the foregoing methods is also contemplated.

BRIEF DESCRIPTION OF THE DRAWINGS

The accompanying drawings are included to provide a further understanding of the invention, and are incorporated in and constitute a part of the specification. The drawings illustrate embodiments of the invention and, together with a description, serve to explain the principles of the invention.

DETAILED DESCRIPTION OF THE PREFERRED EMBODIMENTS

Figure 1:
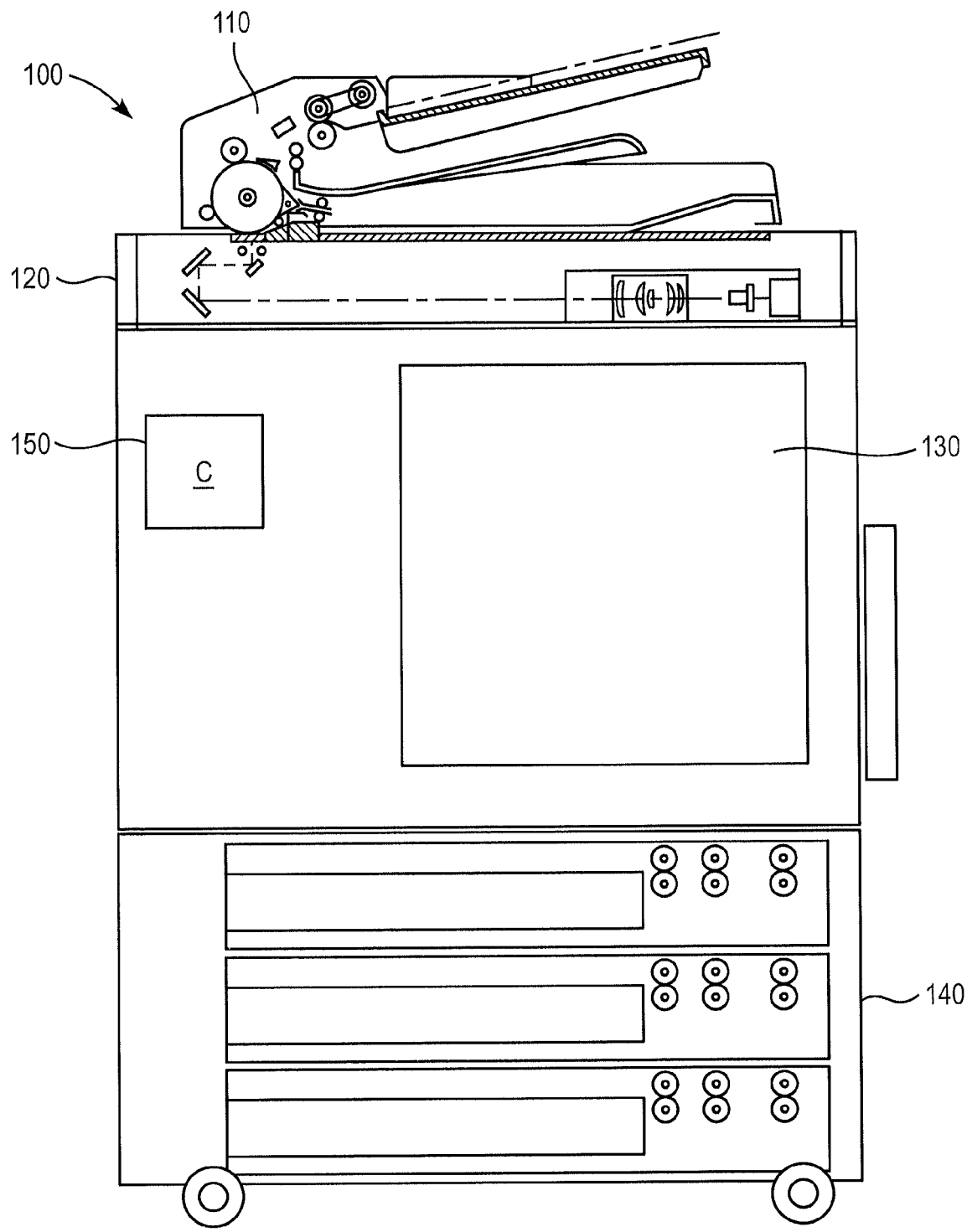
FIG. 1 is an illustration of an image forming apparatus according to one embodiment of the invention.

Reference will now be made in detail to the present preferred embodiments of the invention, examples of which are illustrated in the accompanying drawings. Wherever possible, the same reference numerals are used in the drawings and the description to refer to the same or like parts.

Throughout the descriptions of the preferred embodiments, nomenclature has been adopted to refer to various images as a first image, second image, etc. However, an image referred to by one name in one embodiment may be different than an image in another embodiment having the same name. Thus, for example, the "third image" in the first embodiment may be different than the "third image" in the second embodiment.

FIG. 1 illustrates an image forming apparatus 100 according to at least one embodiment of the present invention. The image forming apparatus includes an automatic document feeder (ADF) 110 for feeding one or more documents to a scanner 120. The ADF 110 may feed the documents in different modes. In a first mode, the documents are fed sequentially so that only the front face of the documents are copied. In a second mode, the documents are fed so that the front face of a document is copied, and the document is then reversed so that a reverse face of the document is copied. The present invention can be employed either manually without an automatic document feeder, or it can be used in automatic mode using an automatic document feeder.

The image forming apparatus 100 also includes an image forming unit 130 for forming images on a recording medium that is fed from one or more trays 140. The image forming apparatus also includes an operating control center 150 that includes a processor and a storage for storing programs for operating the image forming apparatus 100 and a storage for storing image data.

Figure 2:
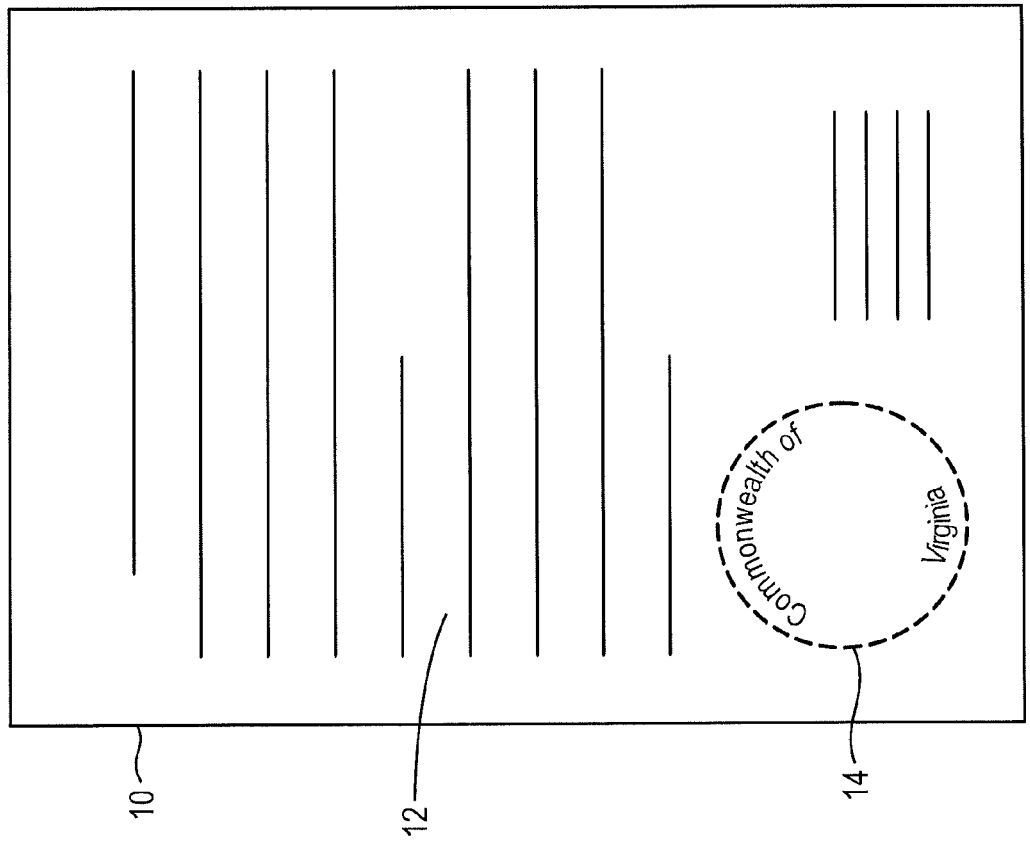
FIG. 2 is an illustration of a document having an original image and an embossment on the front face thereof.

FIG. 2 illustrates a document 10 having an original image 12 thereon and which has been embossed with a raised seal 14. The raised seal 14 may sometimes be referred to herein as an embossment. By "original image" is meant the image on the document 10 prior to adding the embossment 14. An "original image", as used herein may actually be a replica of another document.

When copying a front face of the document on a conventional copier set at an average density reading, only the original image 12 on the document 10 will usually be detected and copied. In most cases, the scanner will not pick up the embossment 14.

A system is provided to enable a clear and readable copy of not only the original image 12 on the document 10, but the embossment 14, as well.

Figure 6:
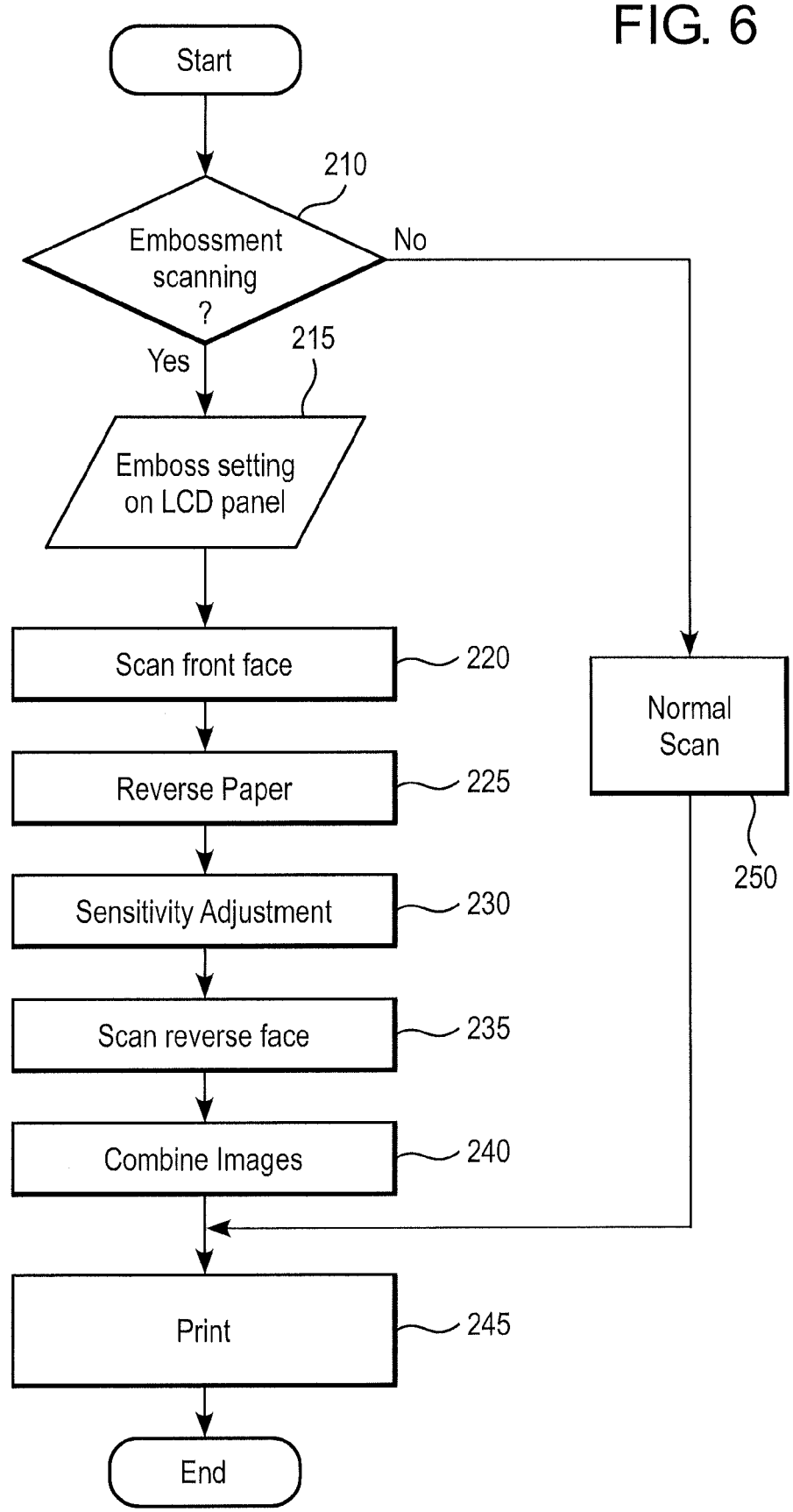
FIG. 6 is a flow chart illustrating an embodiment of the present invention.
Figure 7:
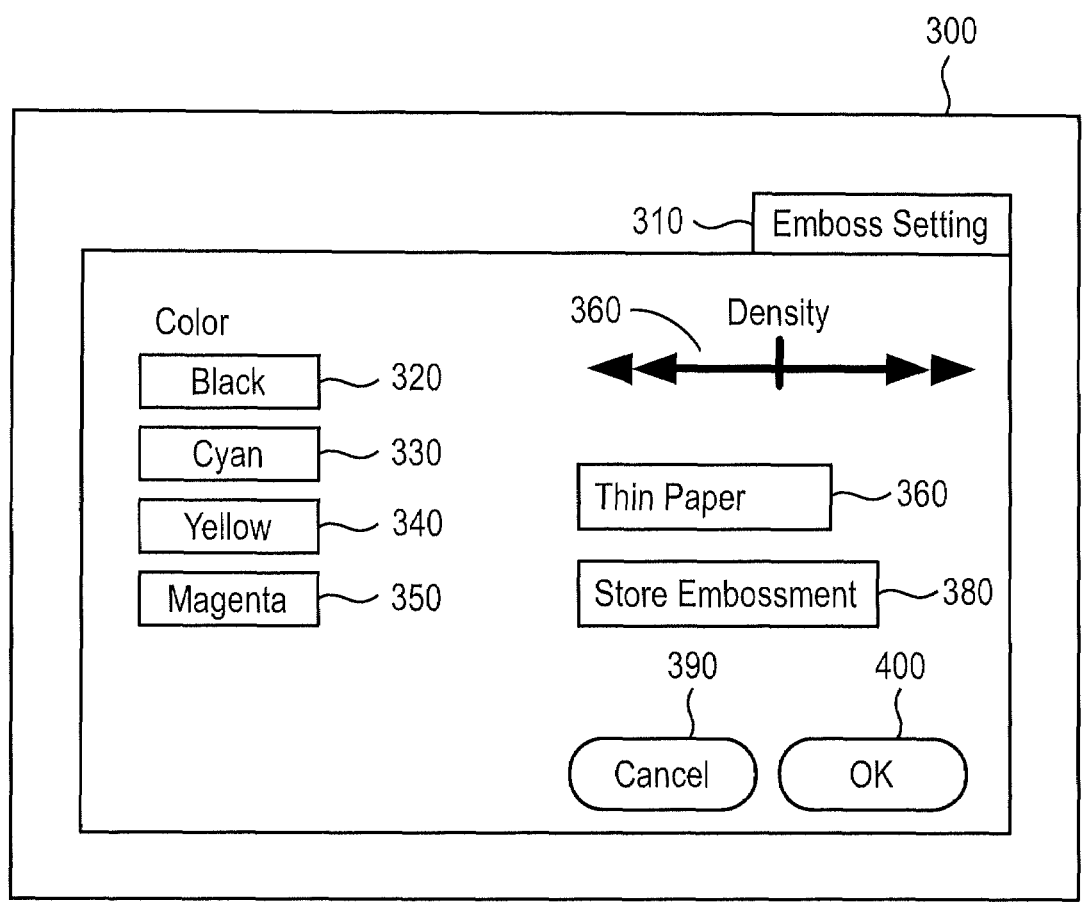
FIG. 7 is an illustration of a control panel of an embodiment of the present invention.

First Embodiment:

According to a first embodiment of the invention, as illustrated in the flow chart of FIG. 6, the operator indicates if Embossment Scanning is to be performed at step 210. FIG. 7 illustrates a control panel 300 for the apparatus 100. The control panel includes a key 310 for initiating embossment scanning.

If embossment scanning is selected at step 210, at step 215, the operator enters any desired settings on the control panel 300. For example, if the embossment 14 is to be printed in a special color, the operator can select the color from among a plurality of keys 320, 330, 340, 350. Although only four colors are illustrated in the disclosed embodiment, the LCD panel 300 may provide additional or alternative selections for the embossment color. The operator can also control the density setting through key 360. In addition, other options (explained hereinafter) may be selected through keys 360, 380. In addition, the key 380 enables the user to cancel the emboss settings. Once the settings are complete, the user presses the OK button 400.

Figure 3:
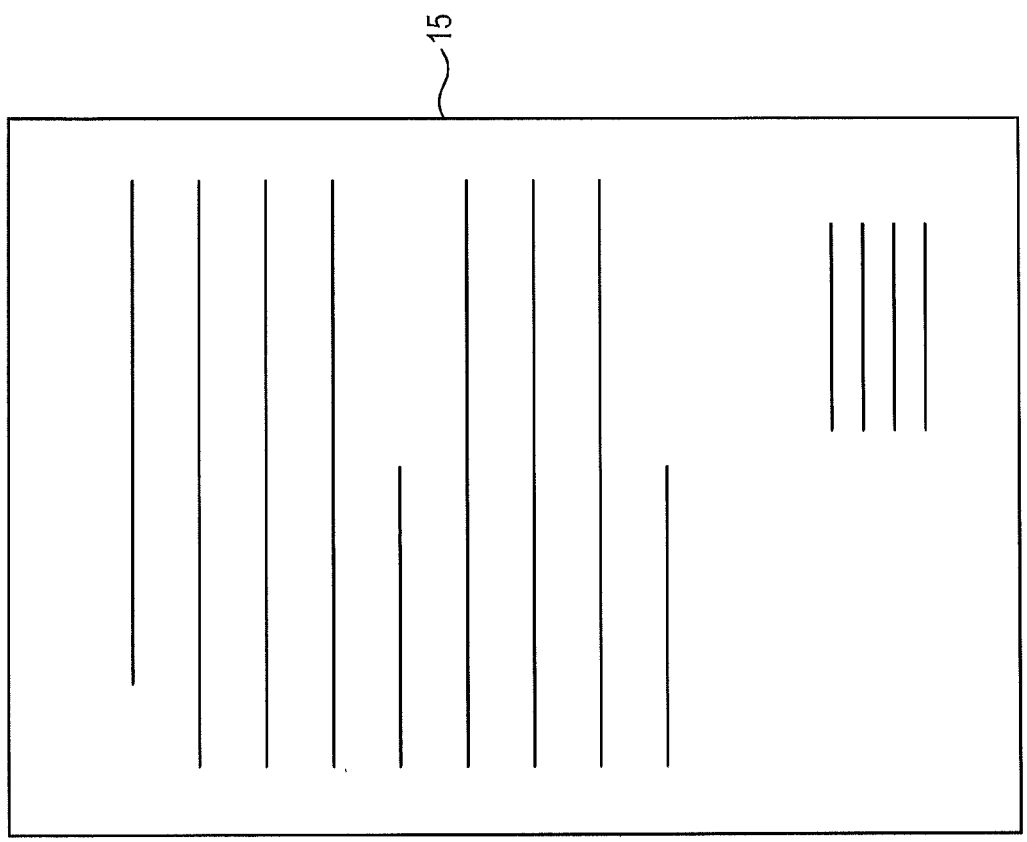
FIG. 3 is an illustration of a copy of the FIG. 2 document having only the original image on it.

The front face of the document 10 is first scanned so as to form a first image 15 at step 220. See FIG. 3. Note that the embossment 14 may not show up in the first image 15. The document 10 is then turned over, either manually or with the automatic document feeder 110 at step 225.

At step 230, the sensitivity or density of the scanner 120 is increased so that the reverse image of the embossment 14, which is detectable at the reverse face of the document, can be more easily picked up by the scanner 120. The scanner settings may be effected in different known methods, such as by gamma correction or adjusting the intensity of the scanner light.

Figure 5:
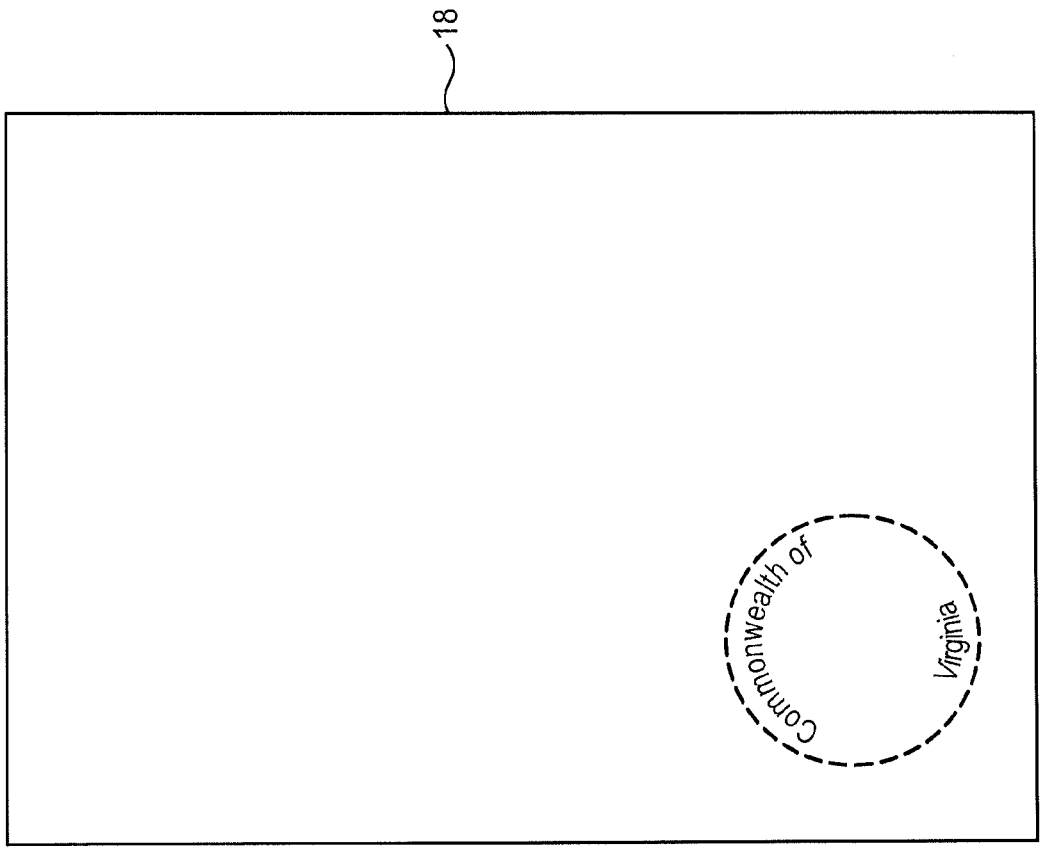
FIG. 5 is an illustration of an image showing only the embossment from the document.
Figure 4:
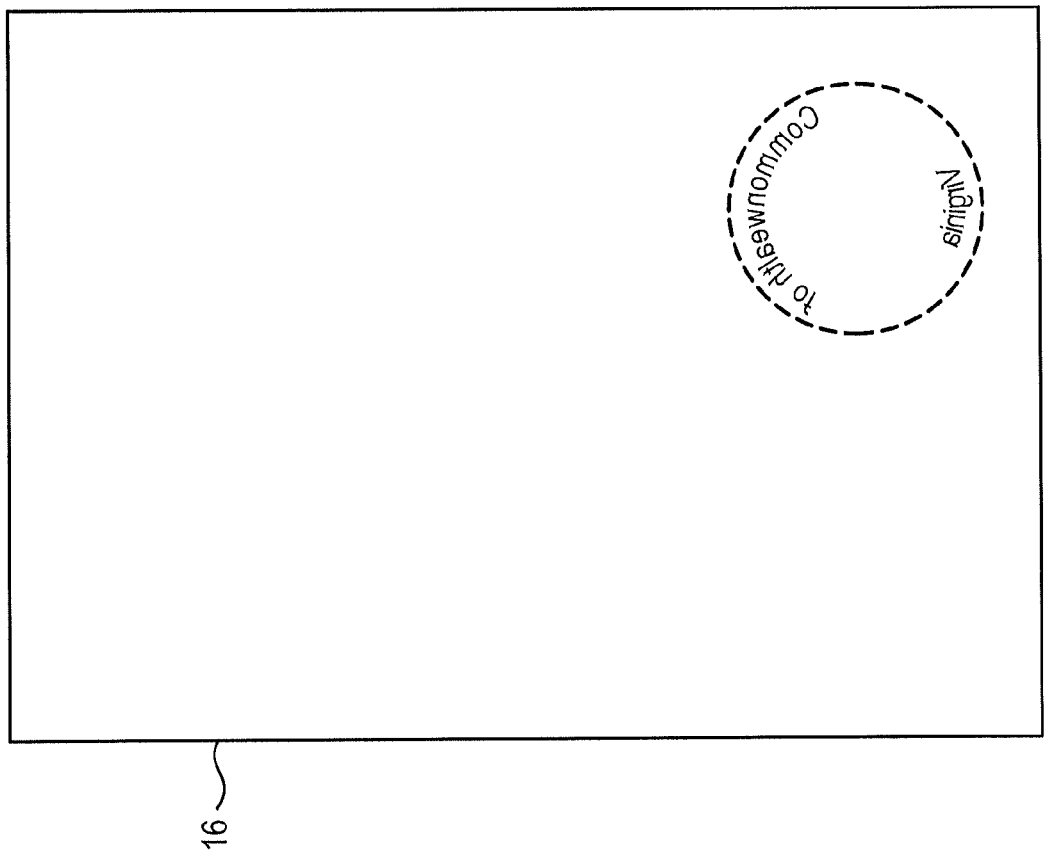
FIG. 4 is an image of a reverse face of the document from which the original image is not visible, and a mirror image of the embossment is visible.

The reverse face of the document 10 is then scanned at step 235. In this embodiment, the scanned image of the reverse face of the document 10 is referred to hereinafter as the second image 16. See FIG. 4. After the second image 16 is created, a mirror of the second image is created to form a third image 18. See FIG. 5. The third image 18 will actually be a true image of the embossment 14.

If a color is selected from the LCD panel, the third image 18 is converted to the selected color, which may be different than a color of the first image.

Then, the first and the third images are combined at step 240 so as to obtain an accurate reproduction image of the document 10 containing the original image 12 and the embossment 14. If desired, the combined image may be printed (step 245) or stored.

For purposes of combining the first and third images, the first image 15 is separated into a background image and a foreground image. To determine if a pixel in the first image 15 is a background image pixel or a foreground image pixel, a density of the pixel is compared to a threshold value. If the density is below the threshold value, the pixel is considered to be a background image pixel. If the density is above the threshold value, the pixel is considered to be a foreground image. When combining the first and the third images, pixels of the foreground image will obscure an underlying pixel from the third image. However, in areas where the first image includes only background image pixels, the pixel value of the third image is used. Adjustment of the density is made according to conventional methods.

If Embossment Scanning is not selected at step 210, then a normal scan and copy procedure is followed at step 250.

Second Embodiment:

A second embodiment of the invention may be referred to as the "Thin Paper" option. This option is provided to address the situation in which, when forming the second image 16 of the first embodiment, some portions of the original image 12 are picked up and included in the third image 18 as a mirror image of the document 12. In that case, the method illustrated in FIG. 8 may be used. The "Thin Paper" option may be initiated by the "Thin Paper" option key 360 on the control panel 300.

Figure 8:
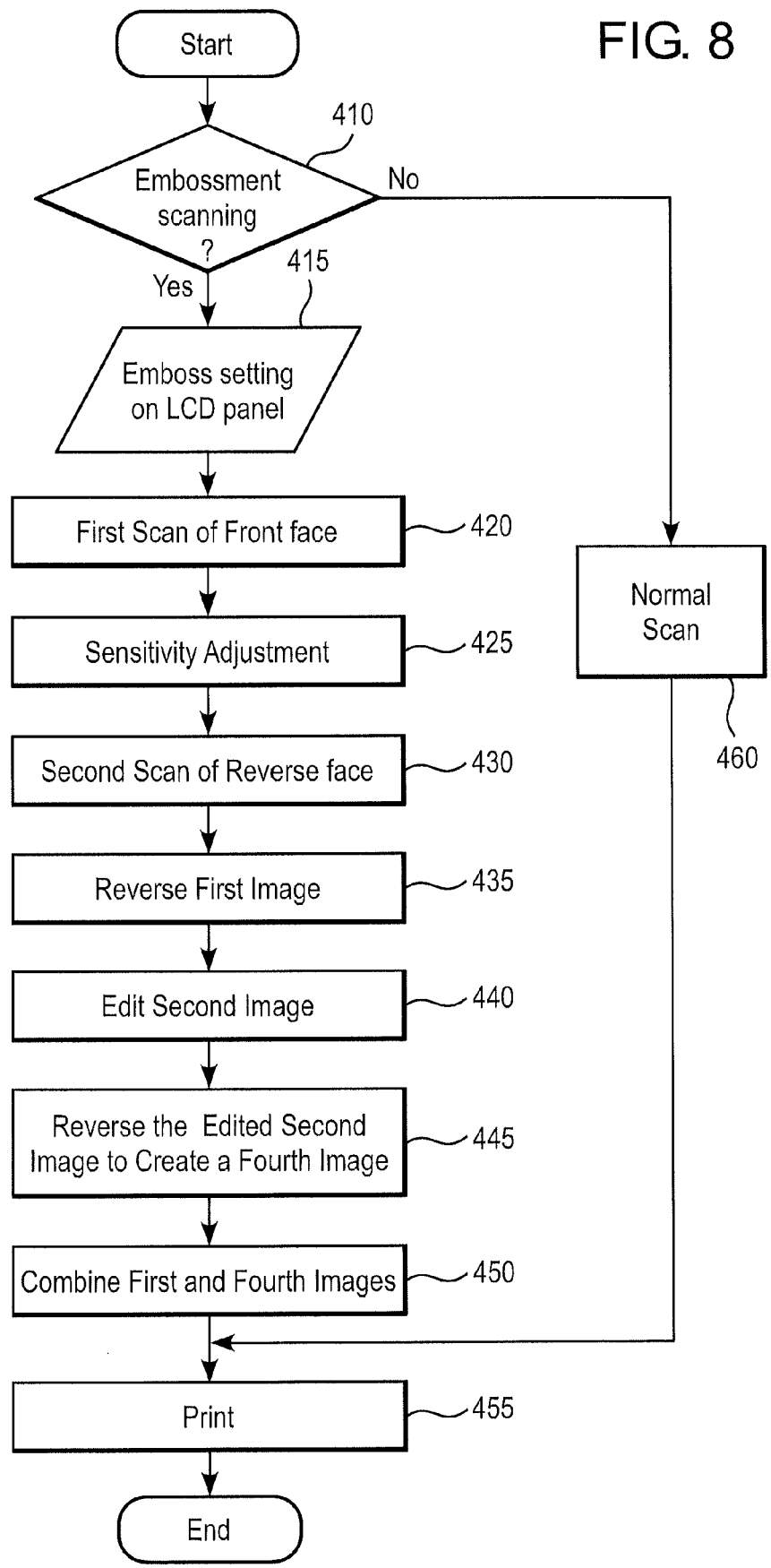
FIG. 8 is a flow chart illustrating a second embodiment of the present invention.

According to the second embodiment of the invention, as illustrated in the flow chart of FIG. 8, the operator indicates if Embossment Scanning is to be performed at step 410 using the key 310 on the control panel 300 for the apparatus 100.

If embossment scanning is selected at step 410, at step 415 the operator then enters any desired settings on the control panel 300. For example, if the embossment 14 is to be printed in a special color, the operator can select the color from among a plurality of keys 320, 330, 340, 350. Although only four colors are illustrated in the disclosed embodiment, the LCD panel 300 may provide additional or alternative selections for the embossment color. The operator can also control the density setting through key 360. In addition, other options (explained hereinafter) may be selected through keys 360, 380. In addition, the key 380 enables the user to cancel the emboss settings. Once the settings are complete, the user presses the OK button 400.

Figure 9:
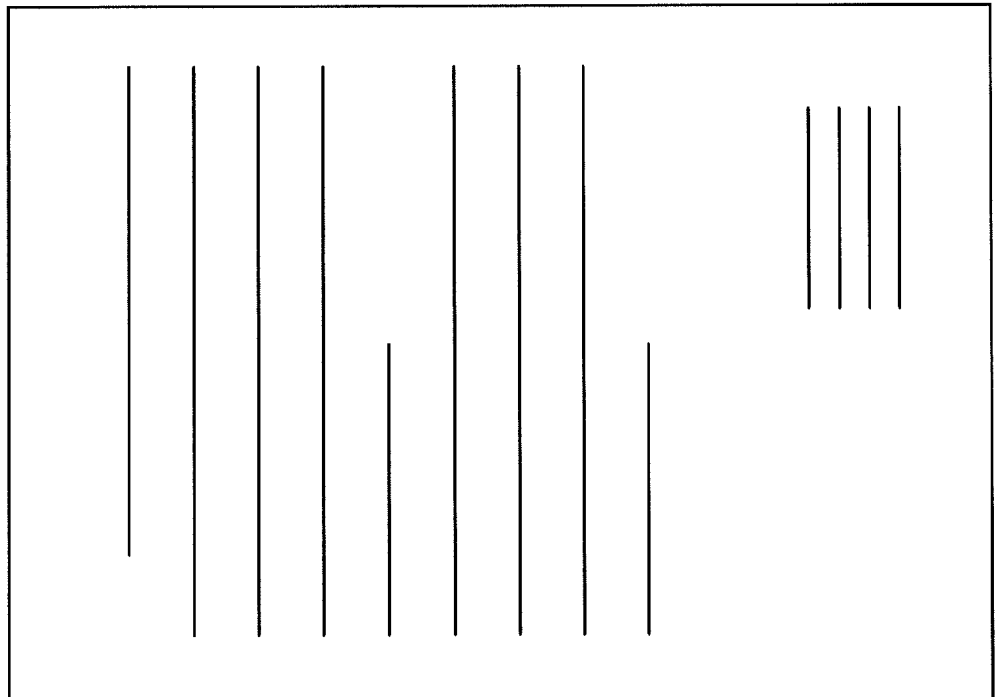

The front face of the document 10 is first scanned so as to form a first image 20 at step 420. See FIG. 9. The first scanning is conducted at a conventional sensitivity. The first image 20 includes a background image and a foreground image. However, the embossment 14 may not be visible in the first image 20.

Figure 10:
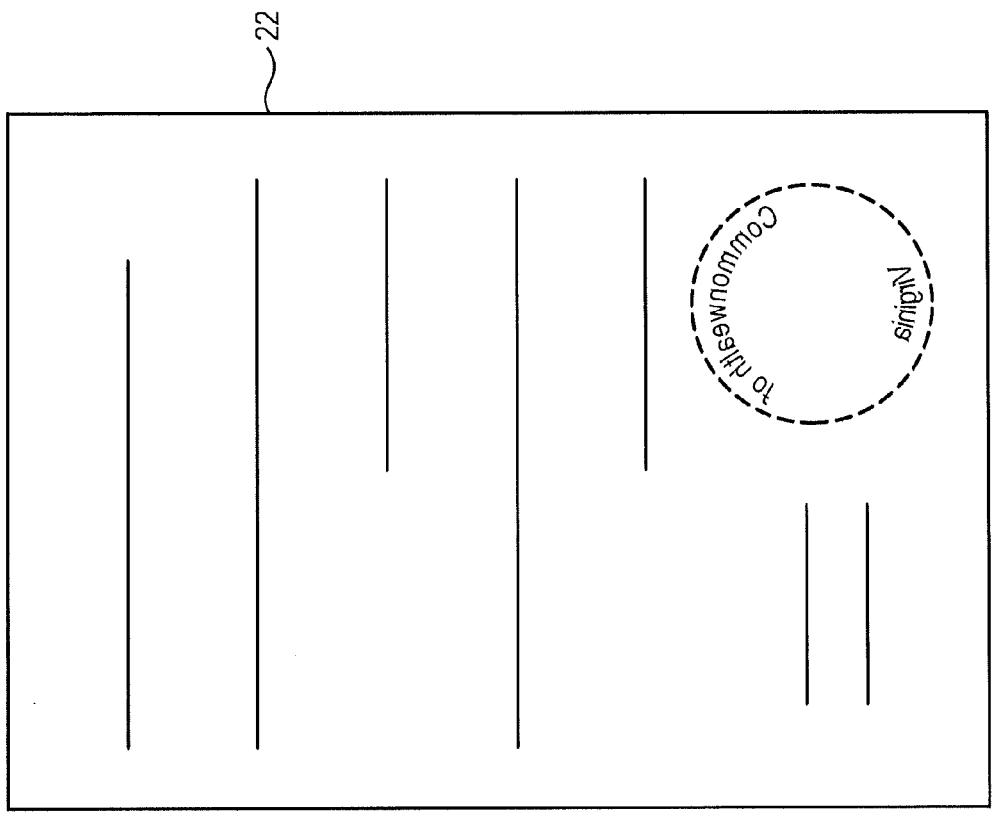
FIGS. 9-13 are illustrations of images created during an operation of one embodiment of the present invention.

At step 425, the sensitivity of the scanner 120 is increased, and at step 430 a second scanning of a reverse face of the document is made to create a second image 22. See FIG. 10. The second image 22 includes a mirror image of the embossment 14 and a mirror image of at least the portions of the original image 12 that happen to bleed through the page.

Figure 12:
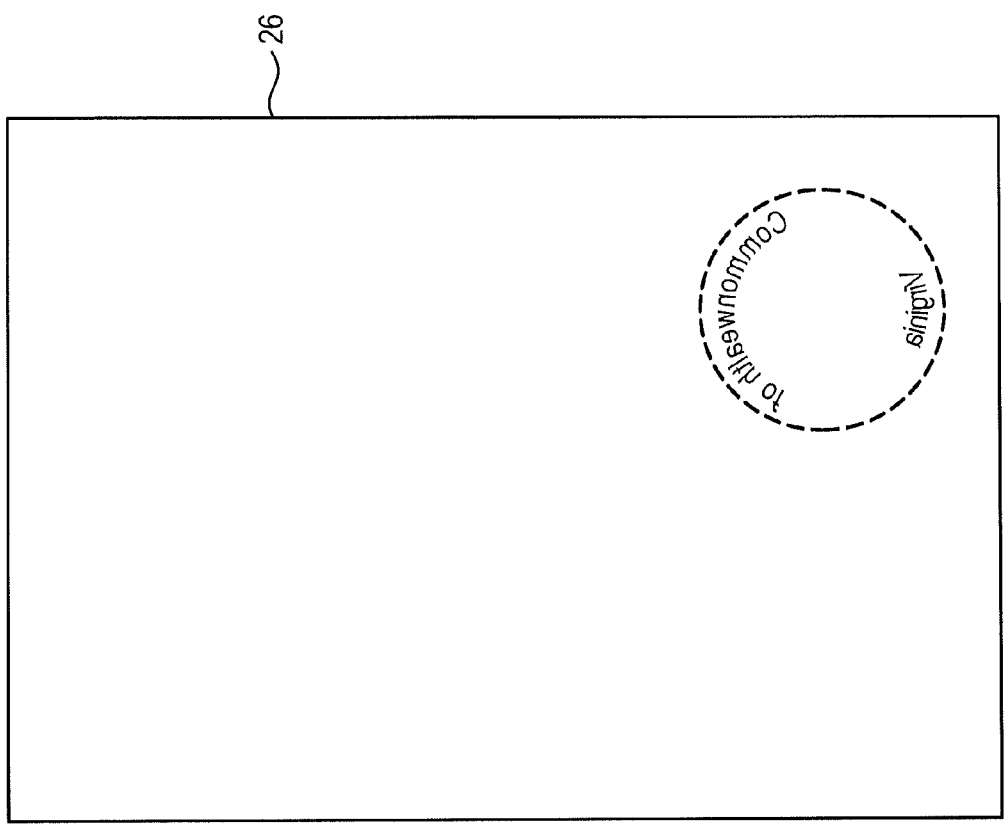
Figure 11:
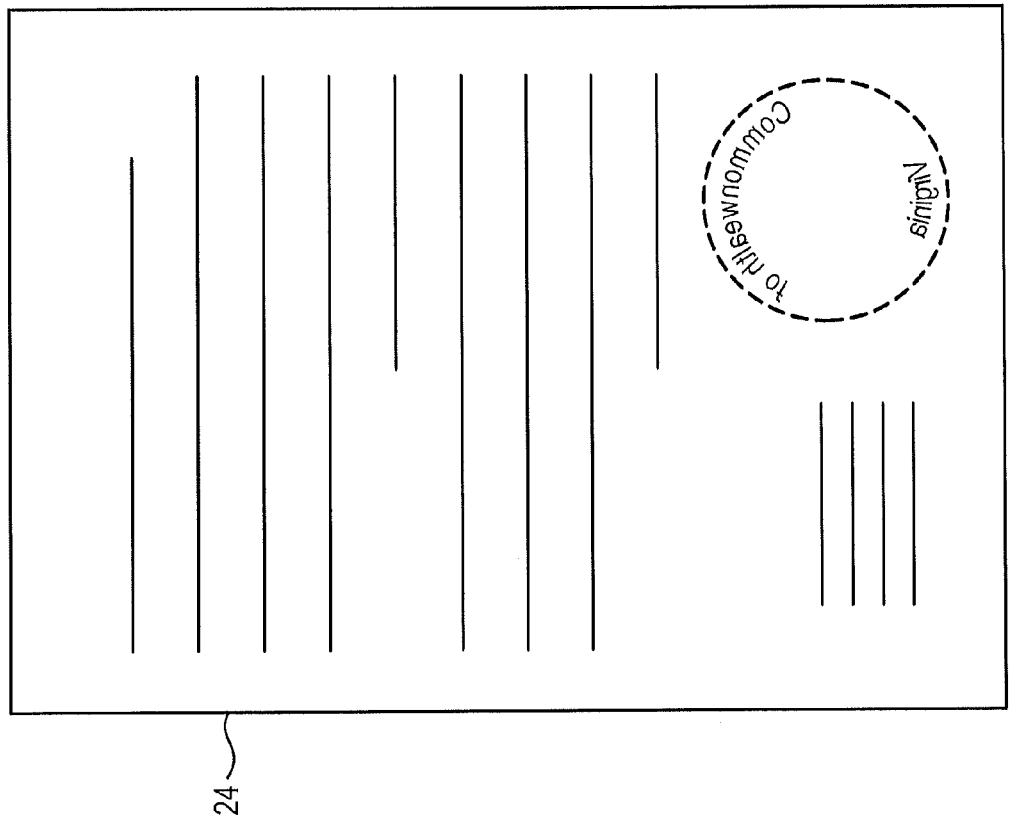

At step 435, the first image 20 is reversed to create a third image 24 which is a mirror image of the first image 20. See FIG. 11. And, at step 440, the second image 22 is edited to remove the mirrored original image bled through the page. Specifically, as a one exemplary method to achieve this removal, the area of the bled and mirrored original image in the second image 22 is determined by using the pixel data of the first image 20; thereafter a mask is created to cover the determined area. This mask is applied to the second image 22 by subtracting to replace the density level of each pixel data in the masked area with the density level that is equivalent to the background of the second image 22, thereby removing the bled and mirrored original image from the second image 22. As a result, the edited second image 26 is a mirror image of only the embossment 14. See FIG. 12.

Figure 13:
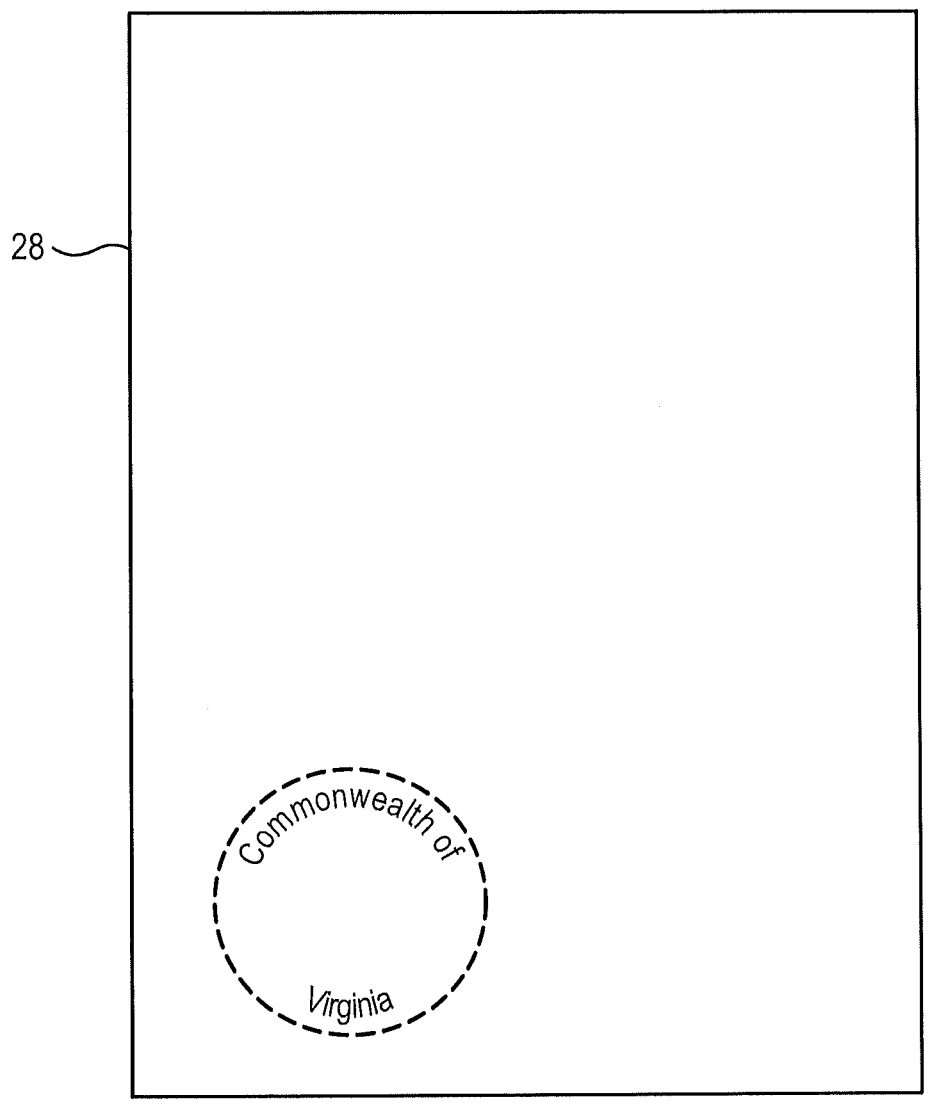

At step 445, the edited second image 26 is reversed to create a fourth image 28 that is essentially a true image of the embossment 14. See FIG. 13. If a color is selected from the LCD panel, the fourth image is converted to the selected color, which may be different than a color of the first image.

Then, at step 450, a composite image is made by combining the first and the fourth images so as to obtain a reproduction image of the original image containing the embossment. In the composite image, the foreground image of the first image obscures the fourth image in overlapping areas.

As in the first embodiment, to determine if a pixel in the first image is a background image pixel or a foreground image pixel, a density of the pixel is compared to a threshold value. If the density is below the threshold value, the pixel is considered to be a background image pixel. If the density is above the threshold value, the pixel is considered to be a foreground image. When combining the first and the fourth images, pixels of the foreground image will obscure an underlying pixel from the fourth image. However, in areas where the first image includes only background image pixels, the pixel value of the fourth image is used. Adjustment of the density is made according to conventional methods.

If Embossment Scanning is not selected at step 410, then a normal scan and copy procedure is followed at step 460.

Third Embodiment:

In the third embodiment, there is no need to reverse the document. All scans may be taken of the front face of the document. The third embodiment is illustrated in FIG. 14.

Figure 14:
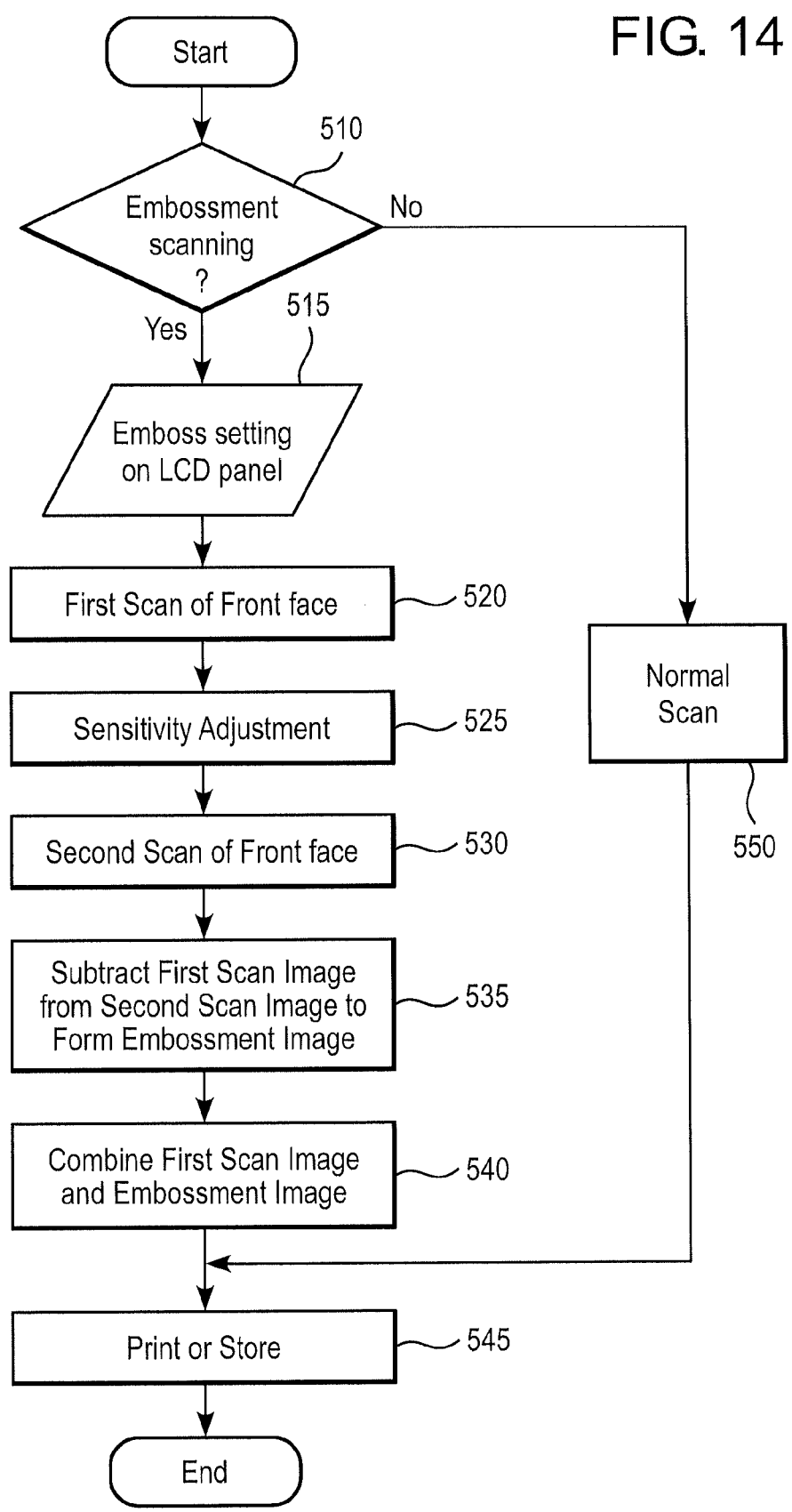
FIG. 14 is a flow chart illustrating a third embodiment of the present invention.

According to the third embodiment of the invention, as illustrated in the flow chart of FIG. 14, the operator indicates if Embossment Scanning is to be performed at step 510 using the key 310 on the control panel 300 for the apparatus 100.

If embossment scanning is selected at step 510, at step 515 the operator then enters any desired settings on the control panel 300. For example, if the embossment 14 is to be printed in a special color, the operator can select the color from among a plurality of keys 320, 330, 340, 350. Although only four colors are illustrated in the disclosed embodiment, the LCD panel 300 may provide additional or alternative selections for the embossment color. The operator can also control the density setting through key 360. In addition, other options (explained hereinafter) may be selected through keys 360, 380. In addition, the key 380 enables the user to cancel the emboss settings. Once the settings are complete, the user presses the OK button 400.

Figure 15:
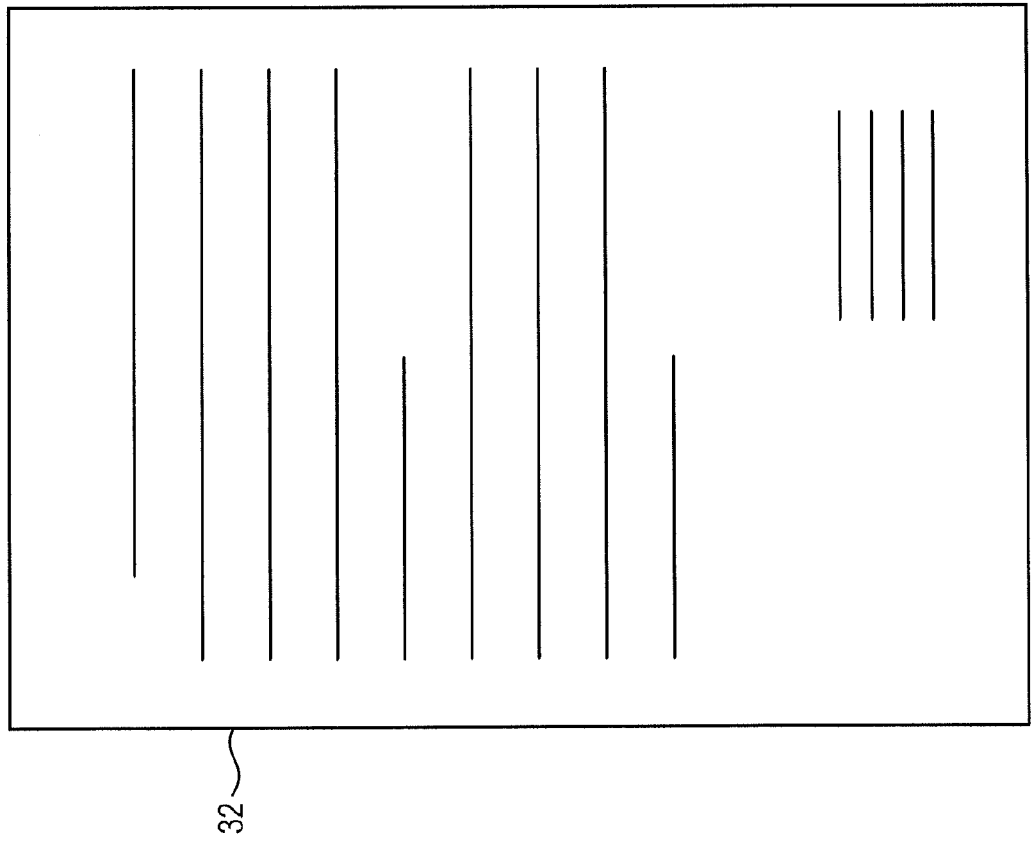

At step 520, a first scanning is made of a front face of the document from which the original image is visible to form a first image 32. See FIG. 15. The first scanning is conducted with a sensitivity such that the embossment 14 is essentially not visible in the first image 32.

Figure 16:
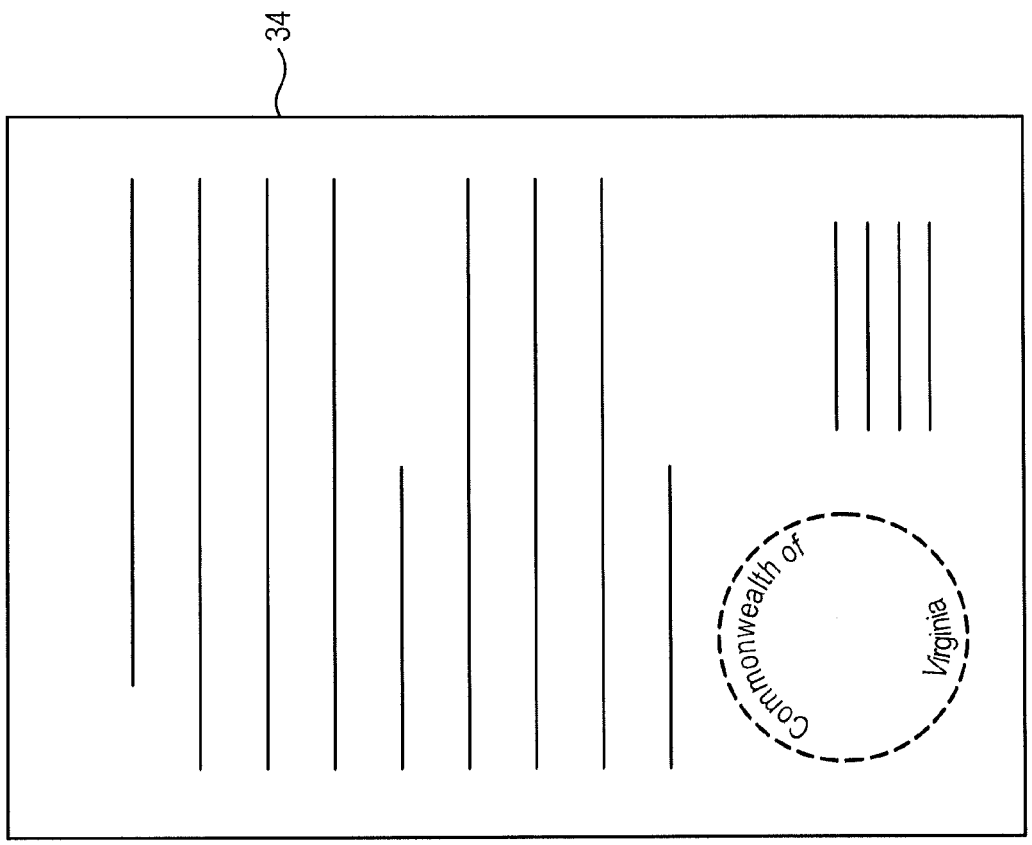
FIGS. 15-17 are illustrations of images created during an operation of another embodiment of the present invention.

After the first scanning, the sensitivity of the scanner 120 is increased at step 525, and at step 530, a second scanning of the front face of the document is taken to create a second image 34. See FIG. 16. Because the first and second scannings are taken at different sensitivity settings, in the first image 32, little or no trace of the embossment 14 is visible, while in the second scanning 34, the embossment 14 is easily visible.

Figure 17:
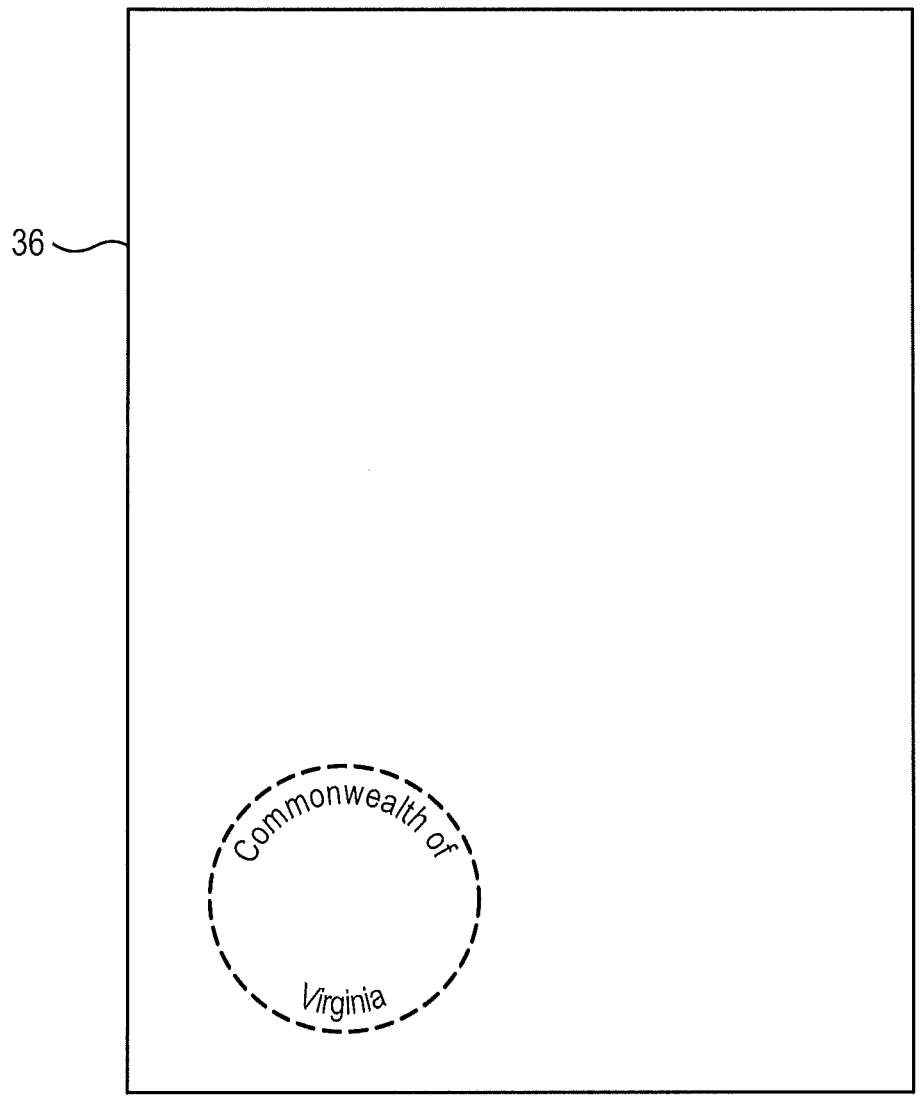

In order to provide an image that includes only the embossment 14, the first image 32 is subtracted from the second image 34 to create a third image 36 in which only the embossment 14 is visible. See FIG. 17. The third image 36 of just the embossment 14 may be stored in a memory for later use. If a color is selected from the LCD panel, the third image 36 is converted to the selected color, which may be different than a color of the first image.

Then, at step 540, a composite image is made by combining the first and the third images 32, 34 so as to obtain a reproduction image of the original image 12 containing the embossment 14. In the composite image, the foreground image of the first image obscures the fourth image in overlapping areas.

As in the first embodiment, to determine if a pixel in the first image is a background image pixel or a foreground image pixel, a density of the pixel is compared to a threshold value. If the density is below the threshold value, the pixel is considered to be a background image pixel. If the density is above the threshold value, the pixel is considered to be a foreground image. When combining the first and the fourth images, pixels of the foreground image will obscure an underlying pixel from the fourth image. However, in areas where the first image includes only background image pixels, the pixel value of the fourth image is used. Adjustment of the density is made according to conventional methods.

For each of the embodiments of the invention, there may be provided an option so as to save the embossment in a memory, such as a hard disk drive. To effect this embodiment, the "store embossment" KEY 380 is depressed on the LCD panel 300. Under that option, when the image of the embossment is completed, it is stored in the hard disk drive so that it may be reused on additional documents.

Although the invention has been described in connection with preferred embodiments thereof, it will be appreciated by those skilled in the art that additions, deletions, modifications, and substitutions not specifically described, are possible without departing from the spirit and scope of the invention as defined in the appended claims.

What is claimed is:

1. A method of using a scanner to copy a document containing an original image and an embossment, the method comprising:
    first scanning a front face of the document from which the original image is visible to form a first image, wherein the first scanning is conducted with a sensitivity such that the embossment is essentially not visible in the first image;
    increasing a sensitivity of the scanner;
    second scanning the document to create a second image, wherein the second scanning is a scanning of a reverse face of the document and the second image includes a mirror image of the embossment, and wherein the embossment is visible in the second image; and
    combining the first and second images so as to obtain a reproduction image of the original image containing the embossment.

2. The method of claim 1, wherein the second scanning is a scanning of the front face of the document.

3. The method of claim 1, wherein the first image is subtracted from the second image so as to obtain a third image that includes an image of the embossment without an image of the original image.

4. The method of claim 3, wherein the third image is converted to a color that is different than a color of the first image.

5. The method of claim 3, wherein the combining step includes forming the third image as an underlying image and forming the first image as an overlying image.

6. The method of claim 5, wherein the first image includes a background image and a foreground image, and the foreground image of the first image obscures the third image in overlapping areas.

7. The method of claim 2, wherein the first image is subtracted from the second image so as to obtain a third image that includes an image of the embossment without an image of the original image.

8. The method of claim 1, wherein the second image is reversed to form a fourth image that is a true image of the embossment, wherein the combining step includes combining the first image with the fourth image so as to obtain the reproduction image of the original image containing the embossment.

9. The method of claim 8, wherein the combining step includes forming the fourth image as an underlying image and forming the first image as an overlying image.

10. The method of claim 9, wherein the first image includes a background image and a foreground image, and the foreground image of the first image obscures the third image in overlapping areas.

11. A method of copying a document containing an original image and an embossment, the method comprising:
 first scanning a front face of the document from which the original image is visible to form a first image;
 second scanning a reverse face of the document from which the embossment is visible to create a second image, wherein the second image includes a reverse image of the embossment;
 reversing the second image to create a third image which is a true image of the embossment; and
 combining the first and third images so as to obtain a reproduction image of the original image containing the embossment.

12. The method of claim 11, wherein the second scanning is done with more sensitivity than the first scanning.

13. The method of claim 11, wherein the third image is converted to a color that is different than a color of the first image.

14. The method of claim 11, wherein the combining step includes forming the third image as an underlying image and forming the first image as an overlying image.

15. The method of claim 12, wherein the first image includes a background image and a foreground image, and the foreground image of the first image obscures the third image in overlapping areas.

16. A method of using a scanner to copy a document containing an original image and an embossment, the method comprising:
 first scanning a front face of the document from which the original image is visible to form a first image, wherein the first image includes a background image and a foreground image;
 increasing a sensitivity of the scanner;
 second scanning a reverse face of the document to create a second image, wherein the second image includes a mirror image of the embossment and a mirror image of at least portions of the original image;
 reversing the first image to create a third image which is a mirror image of the first image;
 editing the second image by removing the third image from the second image; and
 reversing the edited second image to create a fourth image which is a true image of the embossment;
 combining the first image and the fourth image so as to obtain a reproduction image of the original image containing the embossment.

17. The method of claim 16, wherein the fourth image is converted to a color that is different than a color of the first image.

18. The method of claim 16, wherein the combining step includes forming the fourth image as an underlying image and forming the first image as an overlying image.

19. The method of claim 18, wherein the first image includes a background image and a foreground image, and the foreground image of the first image obscures the fourth image in overlapping areas.

20. A non-transitory computer readable medium encoded with a program for causing an image processing apparatus to effect a method comprising:
 first scanning a front face of the document from which the original image is visible to form a first image, wherein the first scanning is conducted with a sensitivity such that the embossment is essentially not visible in the first image;
 increasing a sensitivity of the scanner;
 second scanning the document to create a second image, wherein the second scanning is a scanning of a reverse face of the document and the second image includes a mirror image of the embossment, and wherein the embossment is visible in the second image;
 combining the first and second images so as to obtain a reproduction image of the original image containing the embossment.

21. An image processing apparatus comprising:
 a scanner for first scanning a front face of the document from which an original image is visible to form a first image and second scanning of the document from which an embossment on the original image is visible to create a second image, wherein the second scanning is a scanning of a reverse face of the document and the second image includes a mirror image of the embossment;
 a controller for changing a sensitivity of the scanner between the first scanning and the second scanning so that the second scanning is conducted with a higher sensitivity than the first scanning; and
 an image processor for combining the first and second images so as to obtain a reproduction image of the original image containing the embossment.

22. A non-transitory computer readable medium encoded with a program for causing an image processing apparatus to effect a method of copying a document containing an original image and an embossment, the method comprising:
 first scanning a front face of the document from which the original image is visible to form a first image;
 second scanning a reverse face of the document from which the embossment is visible to create a second image, wherein the second image includes a reverse image of the embossment;
 reversing the second image to create a third image which is a true image of the embossment; and combining the first and third images so as to obtain a reproduction image of the original image containing the embossment.

23. An image processing apparatus comprising:

a scanner for first scanning a front face of the document from which the original image is visible to form a first image and second scanning a reverse face of the document from which the embossment is visible to create a second image, wherein the second image includes a reverse image of the embossment; and an image processor for reversing the second image to create a third image which is a true image of the embossment, and combining the first and third images so as to obtain a reproduction image of the original image containing the embossment.

* * * * *